Oct. 5, 1948.   C. J. SNYDER   2,450,455
HOLLOW PROPELLER BLADE

Filed Sept. 13, 1944   2 Sheets-Sheet 1

INVENTOR.
Carl J. Snyder
BY Barnes, Kisselle, Laughlin & Raisch
Attorneys

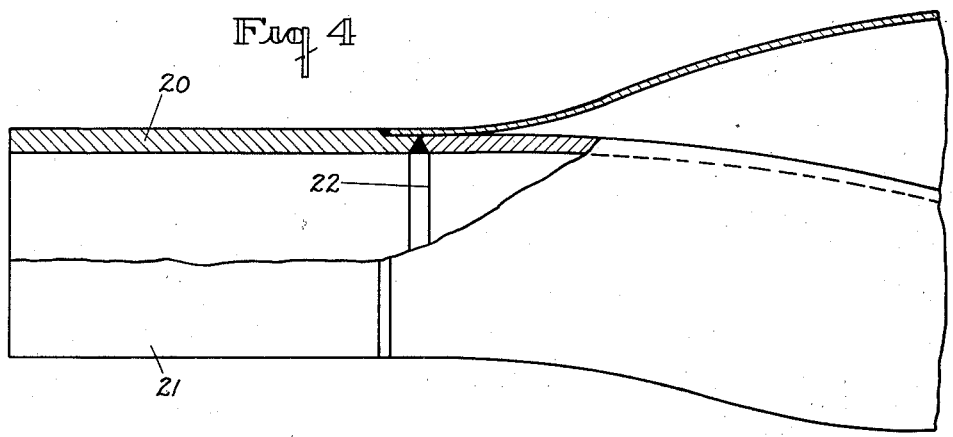
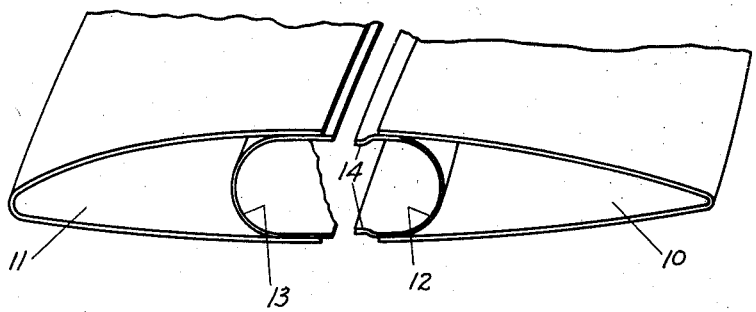
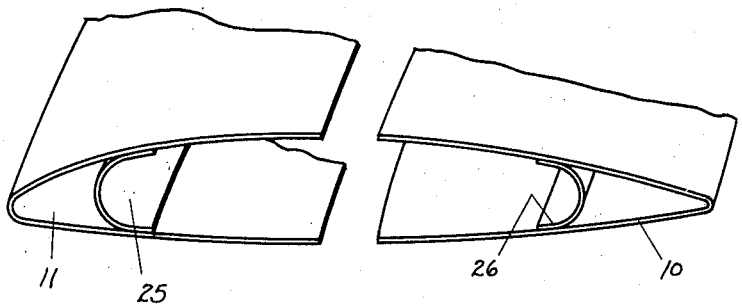

Patented Oct. 5, 1948

2,450,455

UNITED STATES PATENT OFFICE 2,450,455

HOLLOW PROPELLER BLADE

Carl J. Snyder, Detroit, Mich.

Application September 13, 1944, Serial No. 553,876

6 Claims. (Cl. 170—159)

This invention relates to a method of forming a propeller blade and has particularly to do with a novel system of steps for selecting raw material and forming it to the production of a finished and accurately shaped blade. It is particularly an object of the present invention to solve a problem which has been before the industry for some time and which is now most acute, namely, the reduction of the large number of man hours which is necessary for the formation of a propeller blade.

Many attempts have been made to improve the manufacture of propeller blades as is shown by patents on record. There are a number of them that endeavor to form a tube to a certain shape to provide a completed propeller. Others suggest splitting the blade at the leading and trailing edge and forming the two halves separately after which they are joined together. A difficulty which is always met in making a blade from component parts is the joining of the parts without throwing off the balance of the blade and in a manner to leave a clean interior so that loose portions of a weld, for example, will not fly loose in operation and throw the blade out of balance.

A solid blade needs no internal reinforcement but on the other hand the hours required to shape it are inordinately high.

The present invention discloses a method of manufacturing a blade which is so simple that the various problems and disadvantages outlined above are immediately solved. It is an object of the present invention to provide a method of manufacture of a blade from sheet parts by steps that are well known and universally used in production lines today. This permits not only a reduction in raw materials cost but also tremendous reduction in the time previously considered necessary for the manufacture of blades. Furthermore, presently trained labor is available and new machinery is unnecessary.

In addition to the great reduction in cost, the resulting blade is simpler in design, stronger in construction, and unfailing in performance. There are no welds inside to break loose and cause unbalance. The seams that are welded are available to inspection at all times.

Other objects and features of the invention relating to details of the method and of the construction, will be evident in the following description and claims:

In the drawings:

Fig. 4 is an enlarged partial section of the root of the blade.

Fig. 5 shows two portions of the blade in section prior to their being joined.

Fig. 6 illustrates a modification in which additional reinforcements may be inserted in an overly large blade.

Figure 1:
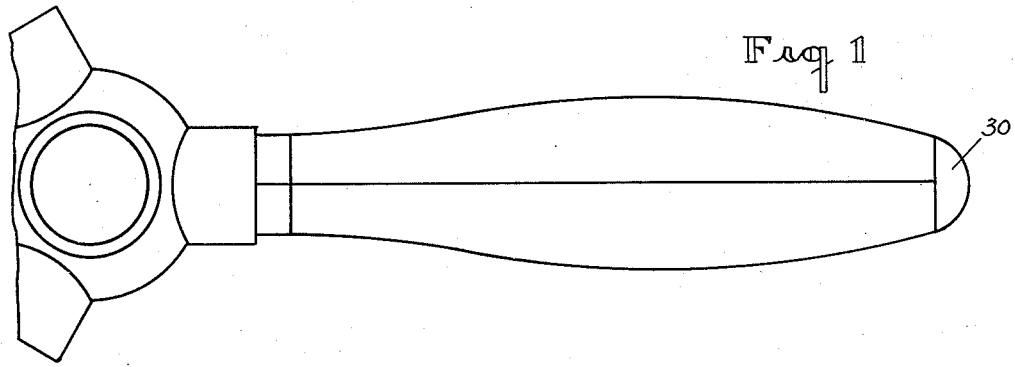
Fig. 1 shows a completed blade.
Figure 2:
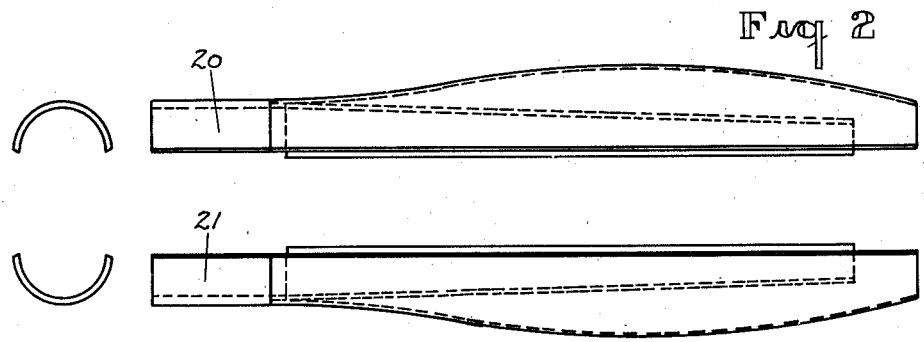
Fig. 2 illustrates the parts of the blade prior to the final assembly step.

The steps in the invention consist in collecting first of all, flat blanks, each of which will form separately a leading and trailing edge of a blade. These blanks may then be formed in a standard open die press to the proper contour for the particular blade being manufactured. The next step consists in forming a tubular sectioned member for each half of the blade, this section having a semi-circular cross section or a U-shaped cross section.

In the drawings, leading and trailing edges of the blade are shown at 10 and 11. In Fig. 5 the open nature of each of these portions is shown. Also in Fig. 5 is found the U-shaped members 12 and 13 each of which is inserted in the opening of the respective portions 10 and 11 and spot welded in place. It should be noted here that all of the steps thus far described leave the parts open for inspection for any defects and also for ready working so that assembly line procedure may be readily adapted to the process.

Figure 3:
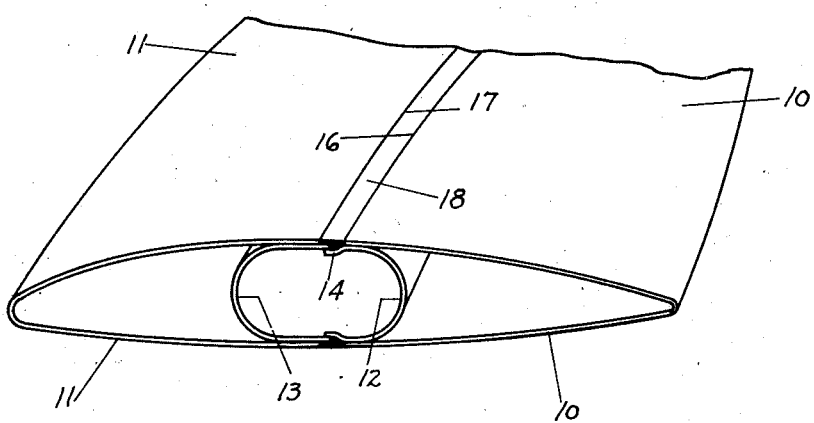
Fig. 3 is a sectional view of the completed blade.

In the formation of the reinforcing members 12 and 13 which eventually form a central spar for the blade, the edges of the members are formed so that they have overlapping relation when joined. Portion 12 as shown in Fig. 5 is reduced slightly in cross section at 14 so that when joined with the part 13 the edges assume overlapping relation as shown in Fig. 3. When the parts are joined as shown in Fig. 3, the edges 16 and 17 of portions 10 and 11 are spaced slightly from each other. An arc weld 18 may now be run along the edges so that parts 10 and 11 securely joined to each other and to the now completed spar or tubular member formed of sections 12 and 13. In the making of this arc weld along the blade the overlap portions of sections 12 and 13 effectively seals the inner portion of the blade from any slag or loose pieces of metal resulting from the weld.

Prior to the joining of sections 10 and 11 semi-circular root sections 20 and 21 are welded to the members 12 and 13 at the point 22 from the inside. This weld is readily made because of the open nature of the parts and may be finished by grinding or sand blasting if necessary prior to the assembly of the parts. When the parts are assembled the root portions 20 and 21 can be readily welded together.

A tip portion 30 is also butt welded to the complete assembly to close the blade after the parts are completely joined and finished.

In Fig. 6 additional portions 25 and 26 are shown between the center and the edges of the blade as additional reinforcing members for a blade which is extremely wide. The remainder of the steps in the formation of the blade following the insertion and spot welding of parts 25 and 26 would be the same as described above.

What I claim is:

1. A method forming a propeller blade which comprises selecting blanks for the leading half and the trailing half of the blade, forming each blank separately to the proper contour with facing edges to be joined adjacent the center of the blade, forming a spar member in split tubular sections shaped with edges to join in overlapping relation to form a closed section, positioning a split tubular section between the facing edges of each half of the blade, assembling the facing edges of the two halves of the blade to cause overlapping of the edges of the tubular sections, and welding the facing edges of the blade over the overlapped edges of the tubular sections.

2. A method of forming a propeller blade which comprises selecting blanks for the leading half and the trailing half of the blade, forming each blank separately to the proper contour with facing edges to be joined adjacent the center of the blade, forming a spar member in two split tubular sections shaped with edges to join in overlapping relation to form a closed section, positioning a split tubular section between the facing edges of each half of the blade, assembling the facing edges of the two halves of the blade to cause overlapping of the edges of the tubular sections, welding the facing edges of each half of the blade together over the overlapping edges of the tubular sections and joining the root of the blade to the spar member and to the formed blade parts.

3. A method of forming a propeller blade which comprises selecting blanks for the leading half and the trailing half of the blade, forming each blank separately to the proper contour with facing edges to be joined adjacent the center of the blade, forming a spar member in two split tubular sections shaped with edges to join in overlapping relation to form a closed section, positioning a split tubular section between the facing edges of each half of the blade, assembling the facing edges of the two halves of the blade to cause overlapping of the edges of the tubular sections, and welding the facing edges of the blades and spar parts all together over the overlap of the tubular sections forming the spar member.

4. A method of forming a propeller blade which comprises selecting blanks for the leading half and the trailing half of the blade, forming each blank separately to the proper contour with facing edges to be joined adjacent the center of the blade, forming a spar member in two split tubular sections shaped with edges to join in leg overlapping relation to form a closed section, positioning a split tubular section between the facing edges of each half of the blade and spot welding the same in place, assembling the facing edges of the two halves of the blade to cause overlapping of the edges of the tubular sections, and welding the edges of each of the parts together above the overlap of the tubular sections forming the spar member.

5. A propeller blade comprising a leading edge section and a trailing edge section, each of hollow cross-section and each open at one side, the open sides of the sections having facing edges similarly spaced and shaped to register with each other, U-shaped members positioned inside and extending longitudinally of each section along the open side thereof with edges projecting out from said sections, each leg of the U-shaped members being in fastened contact with an inner surface of the open sides of the leading and trailing edge sections to furnish structural support thereto, the projections of the respective U-shaped members being arranged to overlap in interfacial contact whereby a tubular section is formed within the blade, and a weld joining the facing edges of the leading and trailing edge sections above the overlap of said tubular sections.

6. A propeller blade comprising a U-shaped sheet metal blade section with its bight portion constituting the trailing edge of the blade, a second U-shaped sheet metal blade section with its bight portion constituting the leading edge of the blade, a channel shaped elongated sheet metal member between the legs of each blade section, the sides of the channels having interfacial contact with the legs of the sections, the edges of the channels extending beyond the edges of the blade sections, the two sections being disposed in facing relation with the extending edge portions of one channel overlapping the edges of the other channel and in interfacial contact, the edges of the blade sections lying in facing relation and spaced apart, and a weld metal filler between the spaced edges for uniting edges of the blade sections and the edges of the channels.

CARL J. SNYDER.

REFERENCES CITED

The following references are of record in the file of this patent:

UNITED STATES PATENTS

| Number | Name | Date |
|---|---|---|
| 1,228,874 | Berry | June 5, 1917 |
| 1,501,606 | Leitner | July 15, 1924 |
| 1,596,114 | Murray | Aug. 17, 1926 |
| 2,008,234 | Weeks | July 16, 1935 |
| 2,050,326 | Hopkins | Aug. 11, 1936 |
| 2,212,170 | Richardson | Aug. 20, 1940 |
| 2,231,750 | Damerell | Feb. 11, 1941 |
| 2,231,772 | Nelson | Feb. 11, 1941 |

FOREIGN PATENTS

| Number | Country | Date |
|---|---|---|
| 28,083 | Great Britain | 1913 |
| 126,068 | Great Britain | May 8, 1919 |
| 126,456 | Great Britain | May 8, 1919 |
| 219,477 | Great Britain | July 31, 1924 |
| 328,741 | Germany | Nov. 3, 1920 |
| 452,611 | Great Britain | Apr. 9, 1936 |
| 541,759 | Great Britain | Dec. 10, 1941 |
| 700,360 | Germany | Dec. 18, 1940 |